(12) United States Patent
Enomoto (10) Patent No.: US 6,297,914 B1
(45) Date of Patent: Oct. 2, 2001

(54) ZOOM LENS SYSTEM

(75) Inventor: Takashi Enomoto, Chiba (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/295,495

(22) Filed: Apr. 21, 1999

(30) Foreign Application Priority Data

Apr. 22, 1998 (JP) ................................................ 10-112317

(51) Int. Cl.[7] .......................... G02B 15/14; G02B 13/18
(52) U.S. Cl. ................................... 359/692; 359/714
(58) Field of Search .................... 359/692, 690, 359/687–688, 683, 676, 708, 713–715

(56) References Cited

U.S. PATENT DOCUMENTS

| | | | |
|---|---|---|---|
| 5,280,390 | 1/1994 | Ito | 359/676 |
| 5,570,235 | 10/1996 | Yoneyama | 359/692 |
| 5,663,838 | 9/1997 | Hasushita et al. | 359/692 |
| 5,687,028 | 11/1997 | Ito | 359/692 |
| 5,777,800 * | 7/1998 | Yamaguchi et al. | 359/692 |
| 5,796,527 * | 8/1998 | Ohtake | 359/692 |
| 5,825,557 * | 10/1998 | Ohno | 359/692 |
| 6,108,137 * | 8/2000 | Ohtake | 359/695 |

* cited by examiner

*Primary Examiner*—Jordan M. Schwartz
(74) *Attorney, Agent, or Firm*—Greenblum & Bernstein, P.L.C.

(57) ABSTRACT

A two-lens-group zoom lens system includes a positive first lens group and a negative second lens group in this order from the object, and zooming is performed by varying the distance between the first and the second lens groups. The positive first lens group includes a negative first lens element, a plastic-made second lens element having at least one aspherical surface, and a positive third lens element in this order from the object. The zoom lens system satisfies the following conditions:

$$3.5 < f_T/f_{1G} < 4.5 \qquad (1)$$

$$-4.7 < f_T/f_{2G} < -3.7 \qquad (2)$$

$$63 < \nu_{DL3} \qquad (3)$$

wherein $f_T$ designates the focal length of the entire zoom lens system at the long focal length extremity; $f_{1G}$ designates the focal length of the positive first lens group; $f_{2G}$ designates the focal length of the negative second lens group; and $\nu_{dL3}$ designates the Abbe number with respect to the positive third lens element in the positive first lens group.

5 Claims, 7 Drawing Sheets

FNO= 8.5

— d Line
····· g Line
– – – C Line

−0.5   0.5

SPHERICAL
ABERRATION

CHROMATIC
ABERRATION

LATERAL
CHROMATIC
ABERRATION

ASTIGMATISM

DISTORTION

Fig. 8A

FNO=12.5

— d Line
····· g Line
– – – C Line

−0.5   0.5

SPHERICAL
ABERRATION

CHROMATIC
ABERRATION

LATERAL
CHROMATIC
ABERRATION

ASTIGMATISM

DISTORTION

FNO= 5.3    W= 36.8°   W= 36.8°   W= 36.8°

——— d Line
······· g Line
– – – C Line

——— S
– – M

-0.5  0.5   -0.05  0.05   -0.5  0.5   -5.0 %  5.0

SPHERICAL      LATERAL         ASTIGMATISM   DISTORTION
ABERRATION     CHROMATIC
               ABERRATION
CHROMATIC
ABERRATION

Fig. 13

ZOOM LENS SYSTEM

BACKGROUND OF THE INVENTION

1. Field of the Invention

The present invention relates to a zoom lens system for a compact camera.

2. Description of the Related Art

In a zoom lens system for a compact camera, there is no need to have a longer back focal distance unlike a zoom lens system for a single lens reflex (SLR) camera, which requires a space for providing a mirror behind the photographing lens. Accordingly, a compact camera generally employs a telephoto type lens system in which positive and negative lens groups are provided in this order from the object while a retrofocus type lens system, which includes negative and positive lens groups in this order from the object, is generally employed in a SLR camera.

In a telephoto type two-lens-group zoom lens system, distribution of power over the front and the rear lens groups is an important factor in order to reduce aberrations and to make a camera compact. Furthermore, in order to reduce aberration fluctuations upon zooming, correction of aberrations at each lens group is required. However, it has been difficult to correct aberrations in a zoom lens system in which the half angle-of-view at the short focal length extremity is about 35°, and the zoom ratio is about 2.5. Therefore the number of lens elements and cemented lens elements have been increased, and consequently, a three-lens-group zoom lens system has to be employed. These factors have caused an increase in production cost.

SUMMARY OF THE INVENTION

The object of the present invention is to provide a zoom lens system which attains a half-angle-of-view of about 35° at the short focal length extremity, a zoom ratio of about 2.5, and makes the entire lens system compact, while the zoom lens system sufficiently corrects aberrations at each lens group, and reduces aberration fluctuations upon zooming.

Another object of the present invention is to provide a less expensive two-lens-group zoom lens system with fewer number of lens elements.

In order to achieve the above-mentioned object, according to the present invention, there is provided a two-lens-group zoom lens system having a positive first lens group and a negative second lens group in this order from the object, and zooming is performed by varying the distance between the first and the second lens groups. The positive first lens group includes a negative first lens element, a plastic-made second lens element having at least one aspherical surface, and a positive third lens element in this order from the object. The zoom lens system satisfies the following conditions:

$$3.5 < f_T/f_{1G} < 4.5 \quad (1)$$

$$-4.7 < f_T/f_{2G} < -3.7 \quad (2)$$

$$63 < \nu_{dL3} \quad (3)$$

wherein:

$f_T$ designates the focal length of the entire zoom lens system at the long focal length extremity;

$f_{1G}$ designates the focal length of the positive first lens group;

$f_{2G}$ designates the focal length of the negative second lens group;

$\nu_{dL3}$ designates the Abbe number with respect to the positive third lens element in the positive first lens group.

The zoom lens system according to the present invention preferably includes, in the negative second lens group, a lens element having at least one aspherical surface, and the zoom lens system satisfies the following condition:

$$0 < \Delta V_{ASP} < 0.2 \quad (4)$$

wherein $\Delta V_{ASP}$ designates an amount of change of a distortion coefficient due to the aspherical surface under the condition that the focal length at the short focal length extremity is assumed to be 1.0.

The negative second lens group preferably includes a plastic-made fourth lens element having at least one aspherical surface, and a negative fifth lens element in this order from the object. Furthermore, the fourth lens element is preferably a positive lens element.

The present disclosure relates to subject matter contained in Japanese Patent Application No. 10-112317 (filed on Apr. 22, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 13:
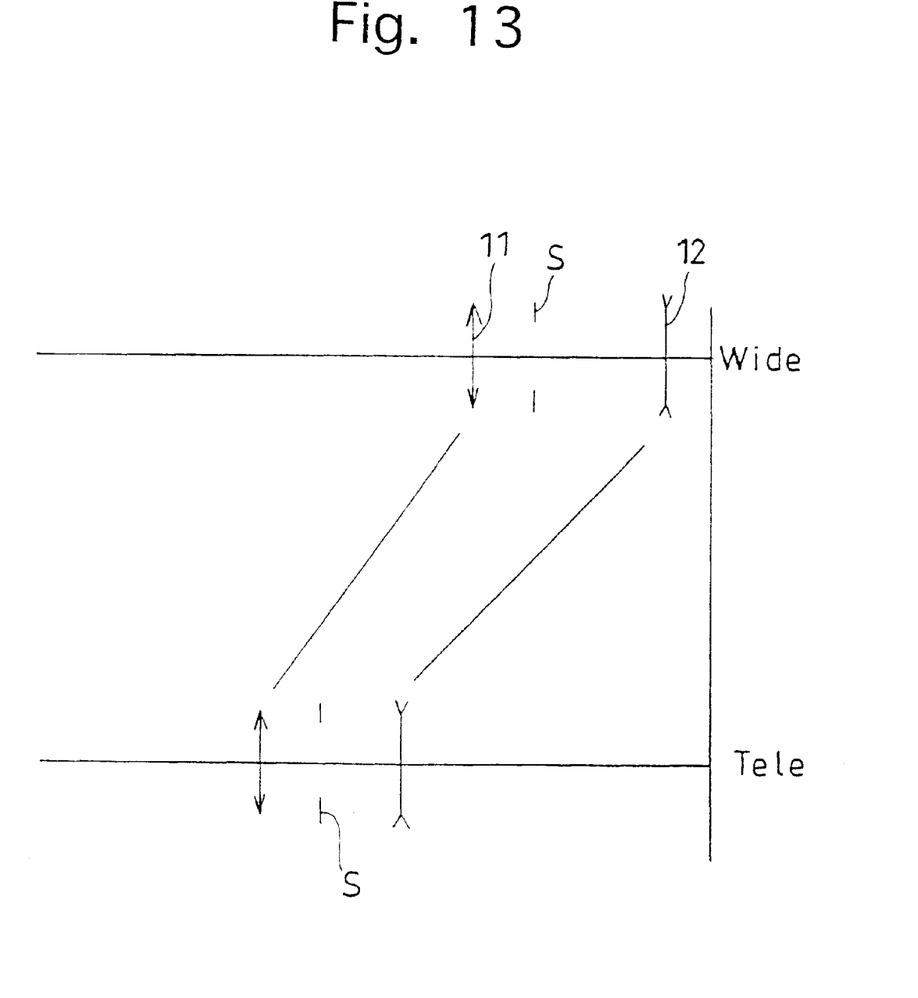
FIG. 13 is a diagram of the traveling paths the of the zoom lens system according to the present invention.

A zoom lens system includes a positive first lens group 11 and a negative second lens group 12 in this order from the object, and the distance between the positive first lens group 11 and the negative second lens group 12 is varied for zooming. According to the traveling paths of the positive first lens group 11 and the negative second lens group 12 indicated in FIG. 13, when zooming is performed from the short focal length extremity toward the long focal length extremity, the positive first lens group 11 and the negative second lens group 12 move together while the distance therebetween is reduced. A Diaphragm S is located between the first lens group 11 and second lens group 12 (FIG. 13), and is arranged to move together with the first lens group 11. On the other hand, focusing can be performed by either the positive first lens group 11 or by the entire lens system.

It should be noted that the positive first lens group 11 includes a negative first lens element, a plastic-made second lens element having at least one aspherical surface, and a positive third lens element in this order from the object.

If the half-angle-of-view at the short focal length extremity is required to be more than 35° while the diameter of a lens element closest to the object is also required to be made smaller, the first lens element is preferably a negative lens element. In a lens system such as the above explained two-lens-group zoom lens system in which the traveling distance for zooming is reduced in order to attain a compact camera while a larger zoom ratio is attained, it is understood that spherical aberration in the positive first lens group 11 is under-corrected because the power of each lens group becomes strong. Therefore for the purpose of correcting spherical aberration effectively, the second lens element of the positive first lens group 11 is made of plastic having at least one aspherical surface formed thereon.

Chromatic aberration upon zooming can be properly corrected by an appropriate Abbe number given to the third lens element. In addition, it is preferable for the negative second lens group 12 to include a lens element having at least one aspherical surface. Due to this aspherical surface, the number of lens elements of a rear sub-lens group of the negative second lens group 12 can be reduced, and distortion can be corrected.

The condition (1) relates to the power of the positive first lens group 11. When the condition (1) is satisfied, the traveling distance of the positive first lens group 11 is reduced, the entire zoom lens system can be made compact, and aberrations occurred in the positive first lens group 11 can properly be corrected.

If $f_T/f_{1G}$ exceeds the upper limit, aberrations in the positive first lens group 11 become larger, so that aberration fluctuations upon zooming are not sufficiently corrected. If $f_T/f_{1G}$ exceeds the lower limit, the traveling distance of the positive first lens group 11 upon zooming becomes longer, so that the entire zoom lens system can not be made compact.

The condition (2) relates to the power of the negative second lens group 12. When the condition (2) is satisfied, the traveling distance of the negative second lens group 12 is reduced, the entire zoom lens system can be made compact, and aberrations generated in the negative second lens group 12 can be properly corrected. If $f_T/f_{2G}$ exceeds the upper limit, the traveling distance of the negative second lens group 12 becomes longer, so that the entire zoom lens system can not be made compact. If $f_T/f_{2G}$ exceeds the lower limit, aberrations in the negative second lens group 12 become larger, so that aberration fluctuations upon zooming are not sufficiently corrected.

The condition (3) relates to the Abbe number of the positive third lens element which is formed as a single lens element. When the condition (3) is satisfied, chromatic aberration occurred over the short focal length extremity to the long focal length extremity can be corrected by a single lens element, i.e., the third lens element.

If $v_{dL3}$ exceeds the lower limit, chromatic aberration over the short focal length extremity to the long focal length extremity can not be sufficiently corrected by the third lens element.

The condition (4) relates to aspherical amount of a lens element, in the negative second lens group 12, having at least one aspherical surface. When the condition (4) is satisfied, distortion can properly be corrected. If $\Delta V_{ASP}$ exceeds the upper limit, aspherical amount becomes larger, so that the lens element on which the aspherical surface is formed is difficult to be produced. If $\Delta V_{ASP}$ exceeds the lower limit, the aspherical surface does not effectively work to correct distortion, so that the correcting of aberrations is not sufficiently made.

The relation between the aspherical coefficients and the aberration coefficients will be herein discussed. The shape of the aspherical surface can be generally defined as follows:

$$x=cy^2/\{1+[1-(1+K)c^2y^2]^{1/2}\}+A4y^4+A6y^6+A8y^8+A10y^{10}+;$$

wherein:

y designates a distance from the optical axis;

x designates a distance from a tangential plane of an aspherical vertex;

c designates a curvature of the aspherical vertex (1/r),

K designates a conic constant;

A4 designates a fourth-order aspherical coefficient;

A6 designates a sixth-order aspherical coefficient;

A8 designates a eighth-order aspherical coefficient; and

A10 designates a tenth-order aspherical coefficient.

In this equation, to obtain the aberration coefficients, the following substitution is made to replace K with "0" (Bi=Ai when K=0).

B4=A4+Kc³/8

B6=A6+(K²+2K)c⁵/16

B8=A8+5(K³+3K²+3K)c⁷/128

B10=A10+7(K⁴+4K³+6K²+4K)c⁹/256

Hence, the following equation is obtained:

$$x=cy^2/\{1+[1-c^2y^2]^{1/2}\}+B4y^4+B6y^6+B8y^8+B10y^{10}+$$

When the focal length f is normalized to 1.0, the resultant value is transformed as shown below. Namely, the following equations are substituted into the above equation:

X=x/f, Y=y/f, C=fc

α4=f³B4, α6=f⁵B6, α8=f⁷B8, α10=f⁹B10

Accordingly, the following equation is obtained.

$$X=CY^2/\{1+[1-C^2Y^2]^{1/2}\}+\alpha 4Y^4+\alpha 6Y^6+\alpha 8Y^8+\alpha 10Y^{10}+$$

The second and subsequent terms define the amount of asphericity of the aspherical surface.

Then the third order aberration contributions due to the fourth order aspherical coefficient α4 are obtained as follows:

ΔI=h⁴Φ

ΔII=h³kΦ

ΔIII=h²k² Φ

$\Delta IV = h^2 k^2 \Phi$ $\Delta V = h k^3 \Phi$ wherein

- I designates the spherical aberration coefficient;
- II designates the coma coefficient;
- III designates the astigmatism coefficient;
- IV designates the sagittal field of curvature coefficient;
- V designates the distortion coefficient;
- h1 designates the height at which a paraxial on-axis ray strikes the first surface of an optical system including an aspherical surface;
- h designates the height at which the paraxial on-axis ray strikes the aspherical surface of the optical system when h1 is 1 (one);

- k1 designates the height at which a paraxial off-axis ray, which comes from an off-axis object point and passes through the center of the entrance pupil, strikes the first surface of an optical system including an aspherical surface;
- k designates the height at which the paraxial off-axis ray strikes the aspherical surface of the optical system when k1 is −1 (minus one); and $\Phi = 8 (N'-N) \alpha 4$ wherein

- N designates the refractive index of a medium on the side of the object with respect to the aspherical surface;
- N' designates the refractive index of a medium on the side of the image with respect to the aspherical surface.

Specific numerical data of the embodiments will be described below via the tables and diagrams. In the diagrams of chromatic aberration (axial chromatic aberration) represented by spherical aberrations, the solid lines and the two types of dotted lines respectively indicate chromatic aberrations with respect to the d, g and C lines. Also, in the diagrams of lateral chromatic aberration, the solid lines and the two types of dotted lines respectively indicate lateral chromatic aberrations with respect to the d, g and C lines. S designates the sagittal image, and M designates the meridional image. $F_{NO}$ designates the F-number, f designates the focal length of the entire zoom lens system, W designates the half angle-of-view, and $f_B$ designates the back focal distance. R designates the radius of curvature of each lens surface, D designates the lens thickness or distance, $N_d$ designates refractive index with respect to the d-line, $v_d$ designates the Abbe number with respect to the d-line.

[Embodiment 1]

Figure 1:
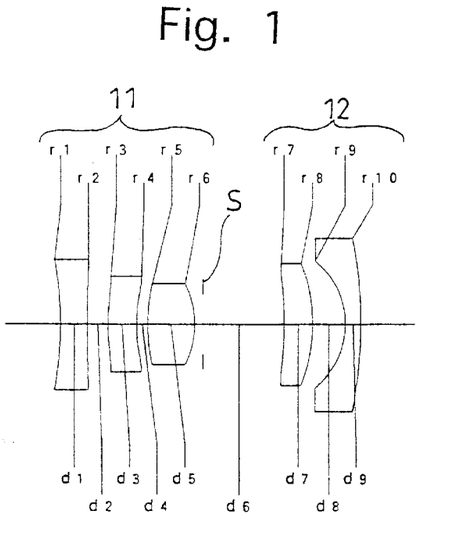
FIG. 1 is a lens arrangement of the first embodiment of a zoom lens system according to the present invention.
Figures 2A, 2B:
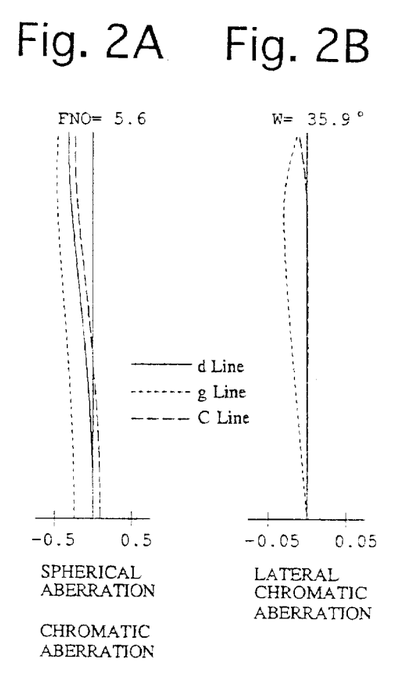
FIGS. 2A, 2B, 2C and 2D are aberration diagrams of the lens arrangement of FIG. 1 at the short focal length extremity.
Figure 2C:
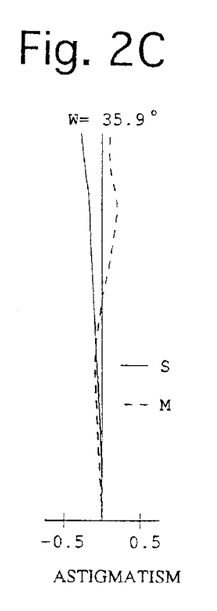
Figure 2D:
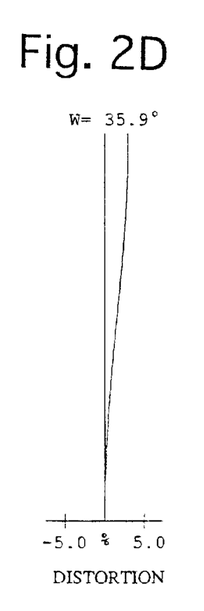
Figures 3A, 3B:
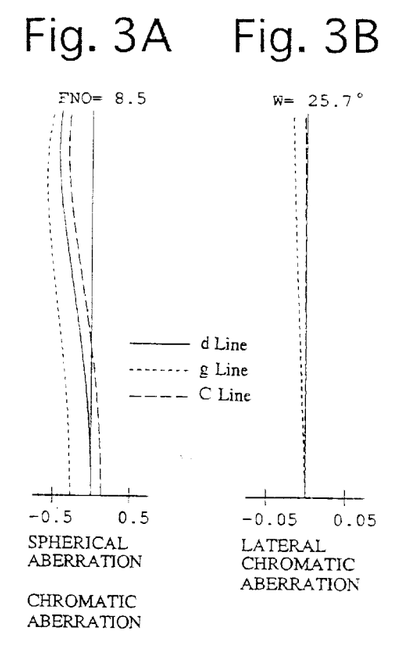
FIGS. 3A, 3B, 3C and 3D are aberration diagrams of the lens arrangement of FIG. 1 at a medium focal-length position.
Figure 3C:
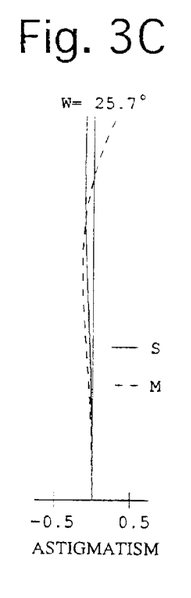
Figure 3D:
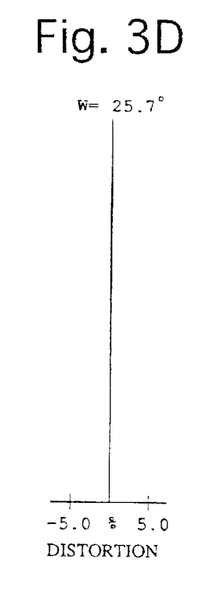
Figures 4A, 4B:
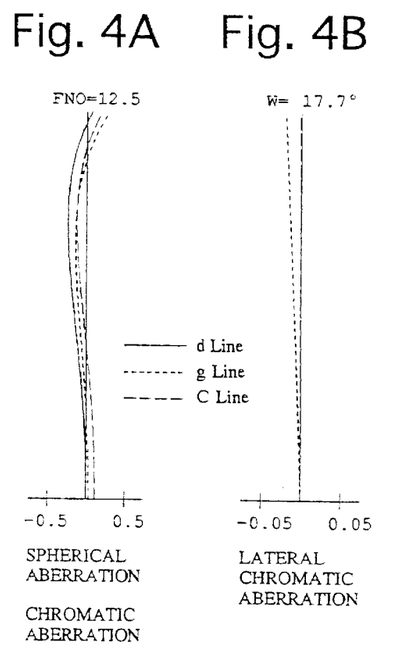
FIGS. 4A, 4B, 4C and 4D are aberration diagrams of the lens arrangement of FIG. 1 at the long focal length extremity.
Figure 4C:
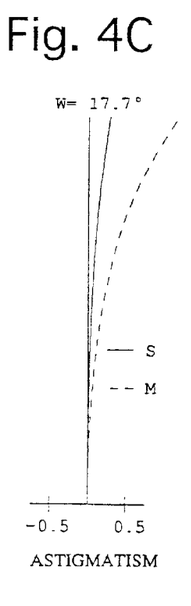
Figure 4D:
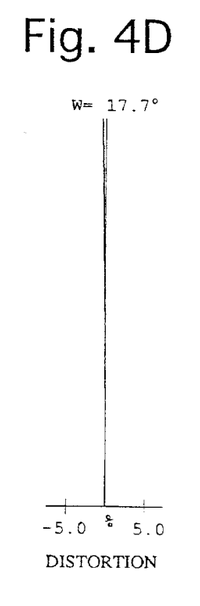

FIG. 1 indicates the lens arrangement of the first embodiment of the zoom lens system. FIGS. 2A, 2B, 2C and 2D, FIGS. 3A, 3B, 3C and 3D, and FIGS. 4A, 4B, 4C and 4D respectively show aberration diagrams of the zoom lens system at the short focal length extremity, a medium focal-length position, and the long focal length extremity. Table 1 shows the numerical data of this embodiment. Surfaces No. 1 to 6 designate the positive first lens group 11, and surface No. 7 to 10 designate the negative second lens group 12. It should be noted that the positive first lens group 11 is composed of a glass-made negative first lens element (surfaces No.1 and 2), a plastic-made second lens element having an aspherical surface on the object-side surface (surface No.3), and a glass-made positive third lens element (surfaces No.5 and 6); in this order from the object. The negative second lens group 12 is composed of a plastic-made fourth lens element (surfaces No.7 and 8) and a glass-made fifth lens element (surfaces No.9 and 10).

TABLE 1

$F_{NO} = 1:5.6–8.5–12.5$
f = 29.00–45.00–68.00 (zoom ratio: 2.34)
W = 35.9° −25.7° −17.7°
$f_B$ = 10.65–25.93–47.91

| Surface No. | R | D | $N_d$ | $v_d$ |
|---|---|---|---|---|
| 1 | −34.336 | 2.40 | 1.83400 | 37.2 |
| 2 | 168.933 | 1.85 | — | — |
| 3* | 20.291 | 2.60 | 1.58547 | 29.9 |
| 4 | 16.179 | 1.00 | — | — |
| 5 | 17.272 | 4.20 | 1.48749 | 70.2 |
| 6 | −8.718 | 0.75 | — | — |
| S | ∞ | 7.35–3.86–1.71 | — | — |
| 7* | −31.238 | 2.60 | 1.58547 | 29.9 |
| 8 | −15.576 | 3.01 | — | — |
| 9 | −7.503 | 1.40 | 1.77250 | 49.6 |
| 10 | −41.346 | — | — | — |

*designates the aspherical surface which is symmetrical with respect to the optical axis.

Aspherical surface data (aspherical surface coefficients not indicated are zero (0.00)):

| Surface No. | K | A4 | A6 | A8 |
|---|---|---|---|---|
| 3 | 0.00 | $-0.3614 \times 10^{-3}$ | $-0.4543 \times 10^{-5}$ | $-0.1363 \times 10^{-6}$ |
| 7 | 0.00 | $0.1437 \times 10^{-3}$ | $0.2196 \times 10^{-6}$ | $0.3855 \times 10^{-7}$ |

[Embodiment 2]

Figure 5:
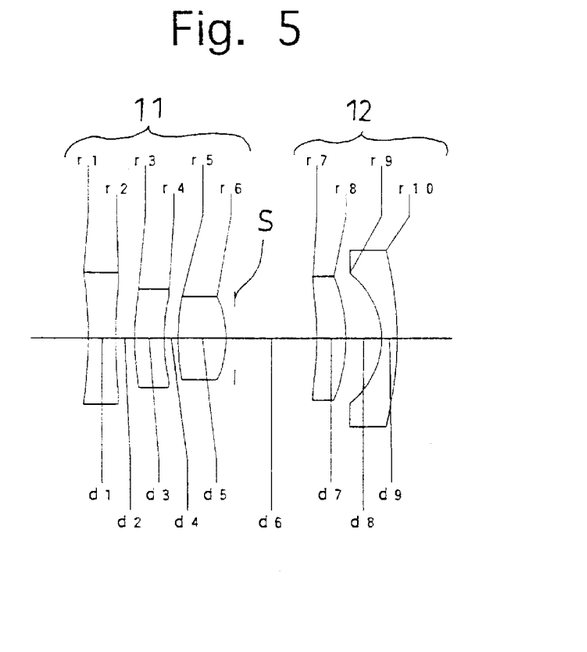
FIG. 5 is a lens arrangement of the second embodiment of a zoom lens system according to the present invention.
Figures 6A, 6B:
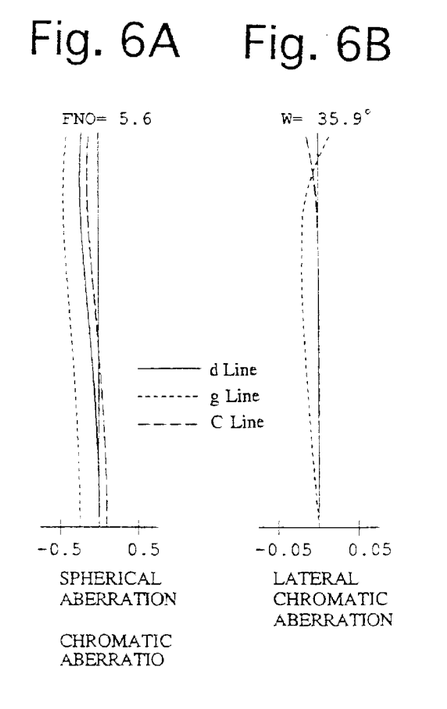
FIGS. 6A, 6B, 6C and 6D are aberration diagrams of the lens arrangement of FIG. 5 at the short focal length extremity.
Figure 6C:
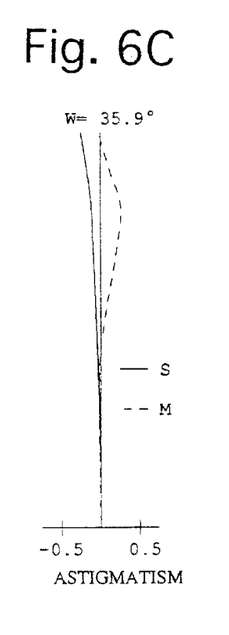
Figure 6D:
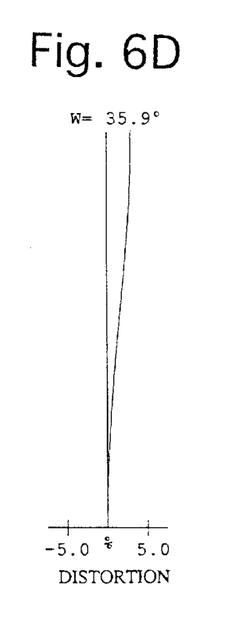
Figure 7A:
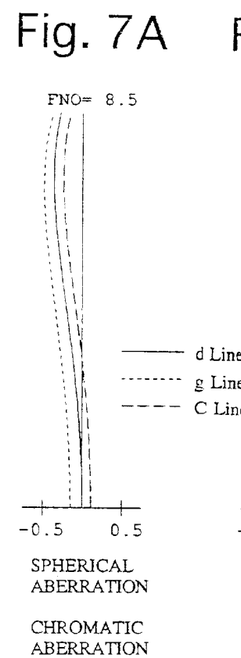
FIGS. 7A, 7B, 7C and 7D are aberration diagrams of the lens arrangement of FIG. 5 at a medium focal-length position.
Figure 7B:
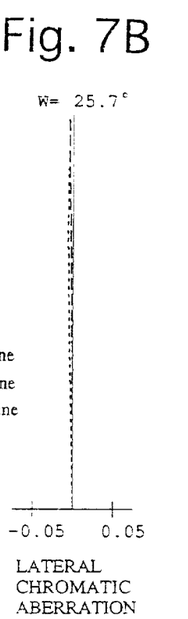
Figure 7C:
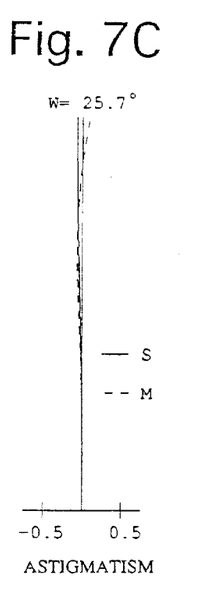
Figure 7D:
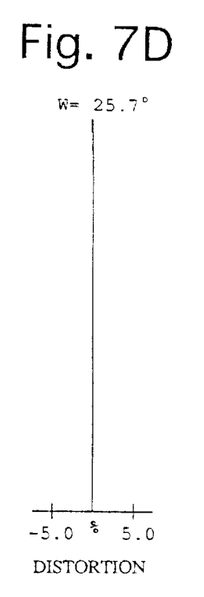
Figure 8A:
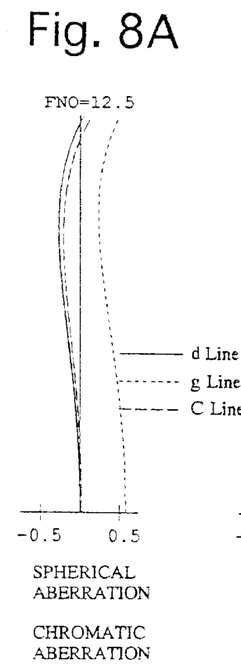
FIGS. 8A, 8B, 8C and 8D are aberration diagrams of the lens arrangement of FIG. 5 at the long focal length extremity.
Figure 8B:
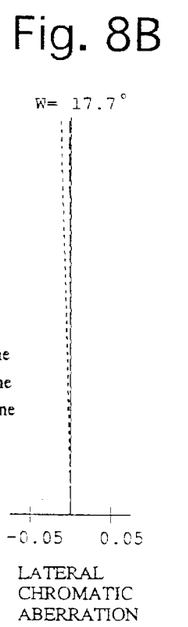
Figure 8C:
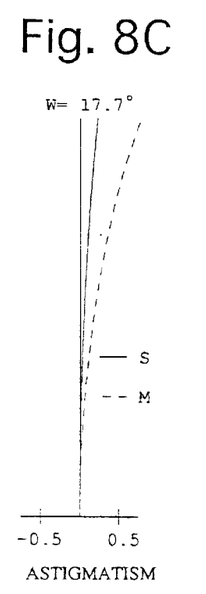
Figure 8D:
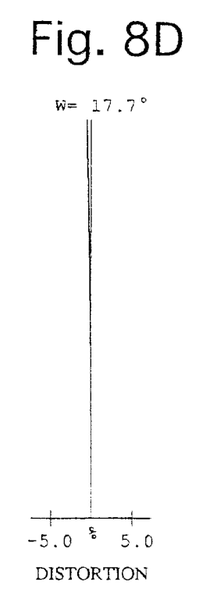

FIG. 5 indicates the lens arrangement of the second embodiment of the zoom lens system. FIGS. 6A, 6B, 6C and 6D, FIGS. 7A, 7B, 7C and 7D, and FIGS. 8A, 8B, 8C and 8D respectively show aberration diagrams of the zoom lens system at the short focal length extremity, a medium focal-length position, and the long focal length extremity. Table 2 shows the numerical data of this embodiment. The lens arrangement is the same as that of the first embodiment.

TABLE 2

$F_{NO} = 1:5.6–8.5–12.5$
f = 29.00–45.00–68.00 (zoom ratio: 2.34)
W = 35.9° −25.7° −17.7°
$f_B$ = 10.69–25.95–47.90

| Surface No. | R | D | $N_d$ | $v_d$ |
|---|---|---|---|---|
| 1 | −44.359 | 2.40 | 1.83400 | 31.3 |
| 2 | 52.376 | 1.64 | — | — |
| 3* | 18.192 | 2.60 | 1.58547 | 29.9 |
| 4 | 17.612 | 1.21 | — | — |
| 5 | 20.002 | 4.20 | 1.51633 | 64.1 |
| 6 | −9.033 | 0.75 | — | — |
| S | ∞ | 7.31–3.87–1.77 | — | — |
| 7* | −28.000 | 2.60 | 1.58547 | 29.9 |
| 8 | −14.802 | 3.17 | — | — |
| 9 | −7.503 | 1.40 | 1.83481 | 42.7 |
| 10 | −32.248 | — | — | — |

*designates the aspherical surface which is symmetrical with respect to the optical axis.

Aspherical surface data (the aspherical surface coefficients not indicated are zero (0.00)):

| Surface No. | K | A4 | A6 | A8 |
|---|---|---|---|---|
| 3 | 0.00 | $-0.3747 \times 10^{-3}$ | $-0.4687 \times 10^{-5}$ | $-0.1316 \times 10^{-6}$ |
| 7 | 0.00 | $0.1416 \times 10^{-3}$ | $0.2322 \times 10^{-6}$ | $0.3950 \times 10^{-7}$ |

[Embodiment 3]

Figure 9:
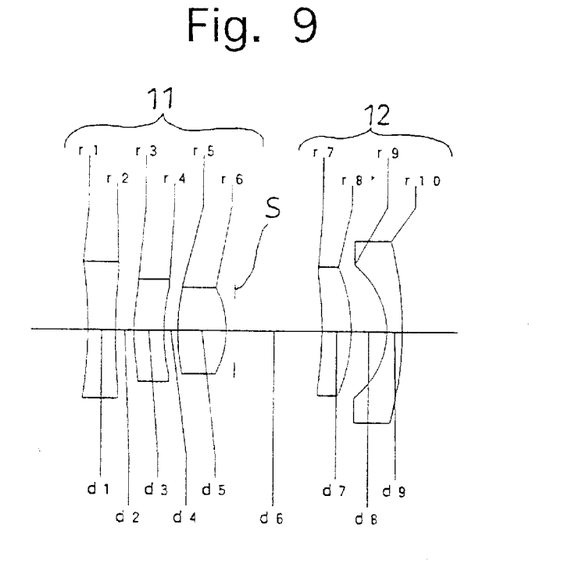
FIG. 9 is a lens arrangement of the third embodiment of a zoom lens system according to the present invention.
Figures 10A, 10B:
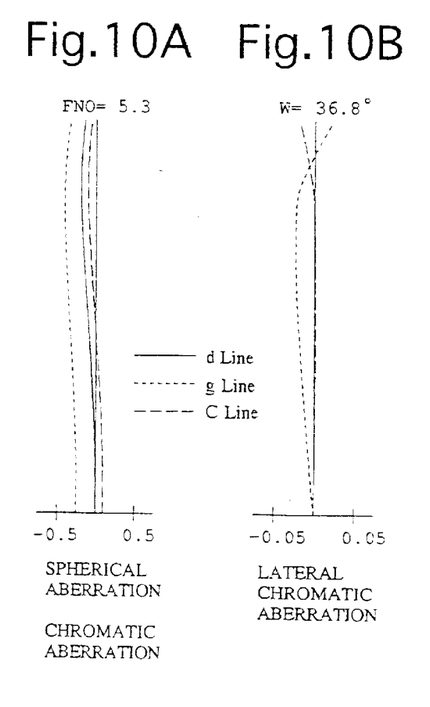
FIGS. 10A, 10B, 10C and 10D are aberration diagrams of the lens arrangement of FIG. 9 at the short focal-length extremity.
Figure 10C:
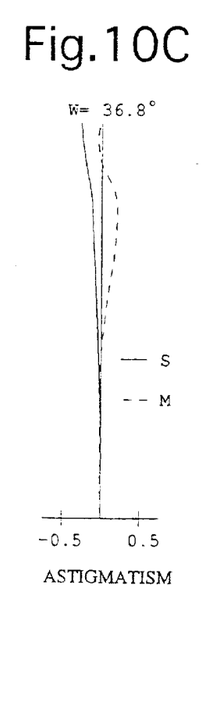
Figure 10D:
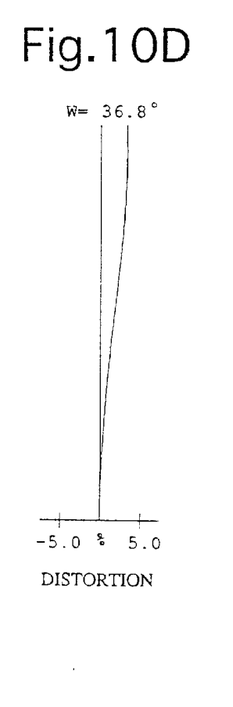
Figure 11A:
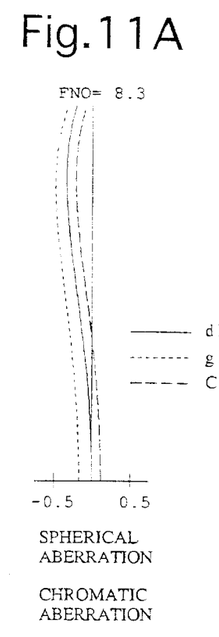
FIGS. 11A, 11B, 11C and 11D are aberration diagrams of the lens arrangement of FIG. 9 at a medium focal-length position.
Figure 11B:
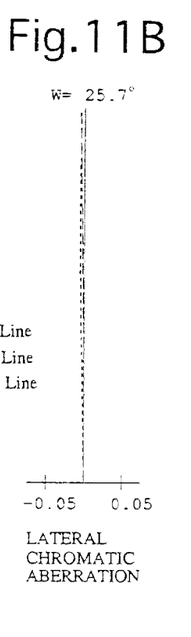
Figure 11C:
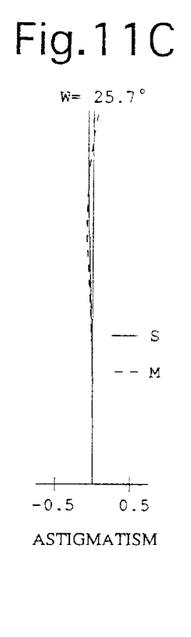
Figure 11D:
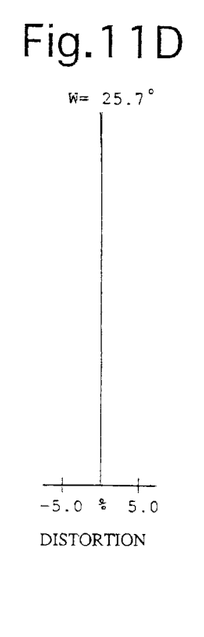
Figure 12A:
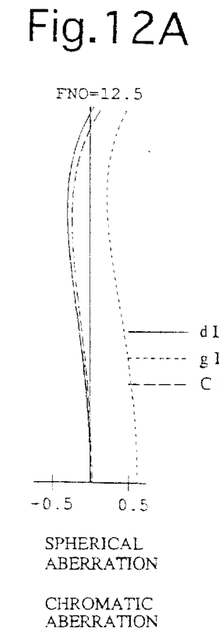
FIGS. 12A, 12B, 12C and 12D are aberration diagrams of the lens arrangement of FIG. 9 at the long focal length extremity.
Figure 12B:
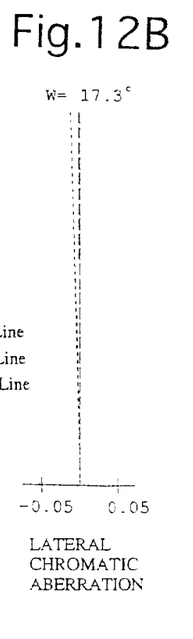
Figure 12C:
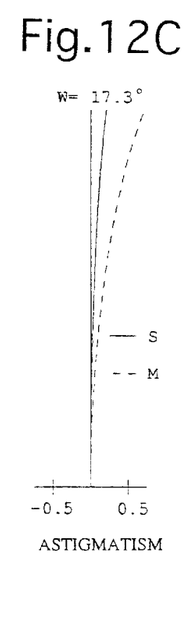
Figure 12D:
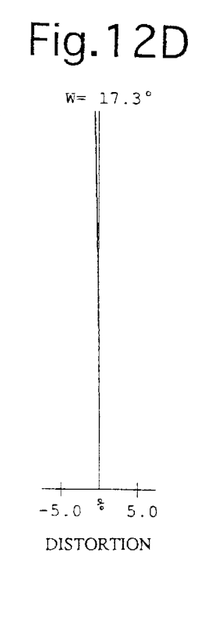

FIG. 9 indicates the lens arrangement of the third embodiment of the zoom lens system. FIGS. 10A, 10B, 10C and 10D, FIGS. 11A, 11B, 11C and 11D, and FIGS. 12A, 12B, 12C and 12D respectively show aberration diagrams of the zoom lens system at the short focal length extremity, a medium focal-length position, and the long focal length extremity. Table 3 shows the numerical data of this embodiment. The lens arrangement is the same as that of the first embodiment.

TABLE 3

$F_{NO} = 1:5.3–8.3–12.5$
$f = 28.00–45.00–70.00$ (zoom ratio: 2.34)
$W = 36.8° –25.7° –17.3°$
$f_B = 9.66–25.93–49.86$

| Surface No. | R | D | $N_d$ | $v_d$ |
|---|---|---|---|---|
| 1 | −44.428 | 2.40 | 1.83379 | 31.5 |
| 2 | 52.444 | 1.64 | — | — |
| 3* | 18.199 | 2.60 | 1.58547 | 29.9 |
| 4 | 17.604 | 1.21 | — | — |
| 5 | 20.281 | 4.20 | 1.51633 | 64.1 |
| 6 | −9.047 | 0.75 | — | — |
| S | ∞ | 7.75–3.90–1.64 | — | — |
| 7* | −28.008 | 2.60 | 1.58547 | 29.9 |
| 8 | −14.804 | 3.23 | — | — |
| 9 | −7.503 | 1.40 | 1.83481 | 42.7 |
| 10 | −31.594 | — | — | — |

*designates the aspherical surface which is symmetrical with respect to the optical axis.

Aspherical surface data (aspherical surface coefficients not indicated are zero (0.00)):

| Surface No. | K | A4 | A6 | A8 |
|---|---|---|---|---|
| 3 | 0.00 | $-0.3723 \times 10^{-3}$ | $-0.4702 \times 10^{-5}$ | $-0.1304 \times 10^{-6}$ |
| 7 | 0.00 | $0.1418 \times 10^{-3}$ | $0.4133 \times 10^{-6}$ | $0.3673 \times 10^{31\ 7}$ |

Table 4 shows the numerical data for each condition of embodiments 1 through 3.

TABLE 4

| Condition | (1) | (2) | (3) | (4) |
|---|---|---|---|---|
| Embodiment 1 | 3.93 | −4.12 | 70.2 | 0.14 |
| Embodiment 2 | 3.97 | −4.16 | 64.2 | 0.12 |
| Embodiment 3 | 4.05 | −4.24 | 64.2 | 0.15 |

It is noted that each embodiment satisfies each condition, and aberrations are sufficiently corrected.

According to the above-explained the telephoto type two-lens-group zoom lens system, a compact and less expensive zoom lens system can be obtained. More concretely, the telephoto type two-lens-group zoom lens system comprises fewer number of lens elements, has the half-angle-of-view of about 35° at the short focal length extremity, and a zoom ratio of about 2.5, while aberrations at each lens group are sufficiently corrected, and aberration fluctuations upon zooming are also reduced.

What is claimed is:

1. A zoom lens system in which a positive first lens group and a negative second lens group are provided in this order from the object, said zoom lens system having a half-angle-of-view at the short focal extremity that is equal to or greater than 35°, and zooming is performed by varying the distance between said positive first lens group and said negative second lens group, wherein said positive first lens group comprises a negative first lens element, a plastic second lens element having at least one aspherical surface, and a positive third lens element in this order from the object, and said zoom lens system satisfies the following conditions:

$$3.5 < f_T/f_{1G} < 4.5$$

$$-4.7 < f_T/f_{2G} < -3.7$$

$$63 < v_{dL3}$$

wherein, $f_T$ designates the focal length of said entire zoom lens system at the long focal length extremity;

$f_{1G}$ designates the focal length of said positive first lens group;

$f_{2G}$ designates the focal length of said negative second lens group; and $v_{dl3}$ designates the Abbe number with respect to said positive third lens element with respect to positive first lens group.

2. The zoom lens system according to claim 1, wherein said negative second lens group comprises a lens element having at least one aspherical surface, and said zoom lens system satisfies the following condition:

$$0 < \Delta V_{ASP} < 0.2$$

wherein $\Delta V_{ASP}$ designates a change in distortion coefficient due to said aspherical surface of said second negative lens group when the focal length at the short focal length extremity is assumed to be 1.0.

3. The zoom lens system according to claim 1, wherein said negative second lens group comprises a plastic fourth lens element having at least one aspherical surface, and a negative fifth lens element in this order from the object.

4. The zoom lens system according to claim 3, wherein said plastic fourth lens element is a positive lens element.

5. The zoom lens system according to claim 1, wherein the object side surface of said negative first lens element is a concave surface.

* * * * *